Patented June 10, 1930

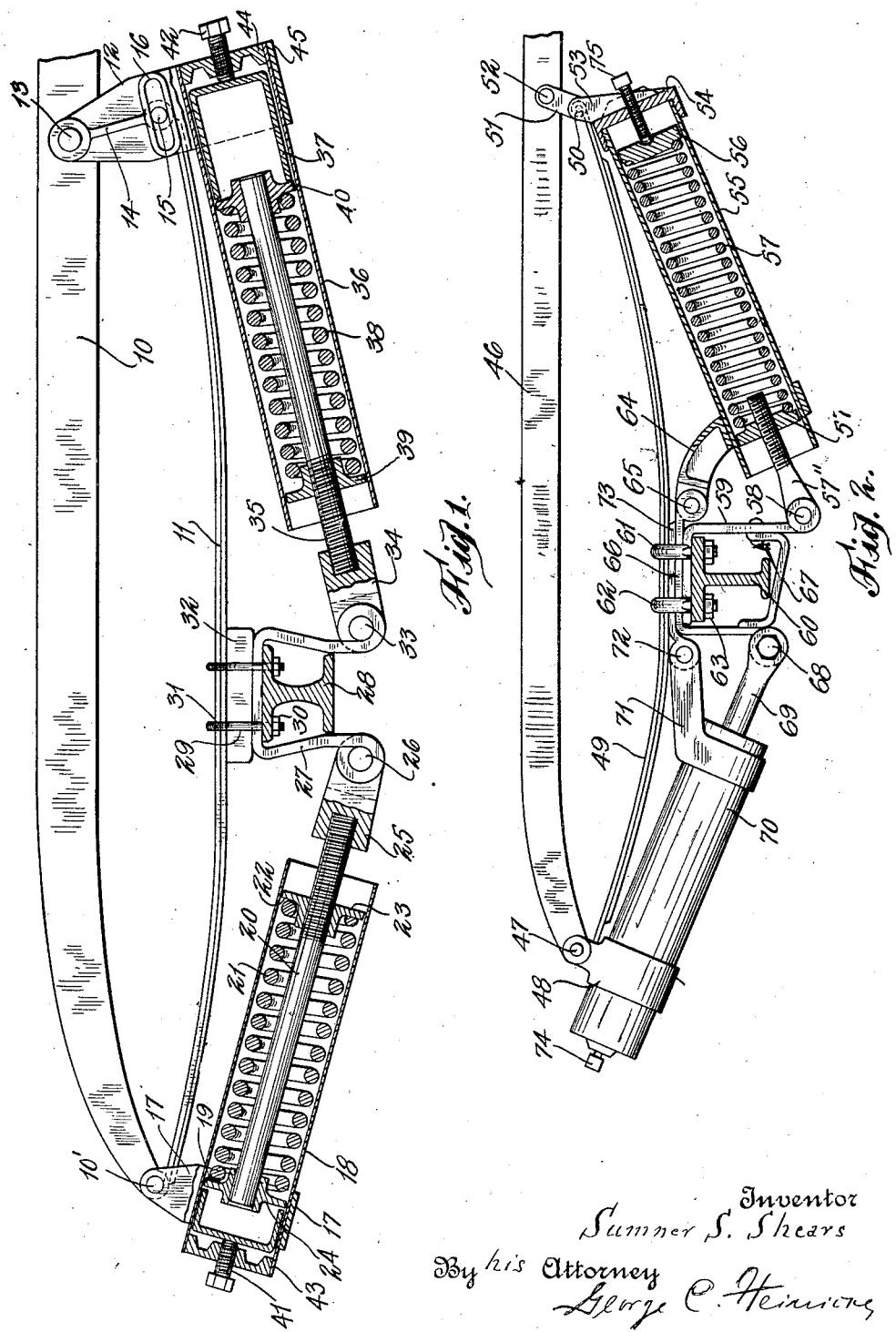
June 10, 1930.    S. S. SHEARS    1,763,192
VEHICLE SPRING
Filed June 28, 1926    2 Sheets-Sheet 1
Inventor
Sumner S. Shears
By his Attorney
George C. Heinrichs

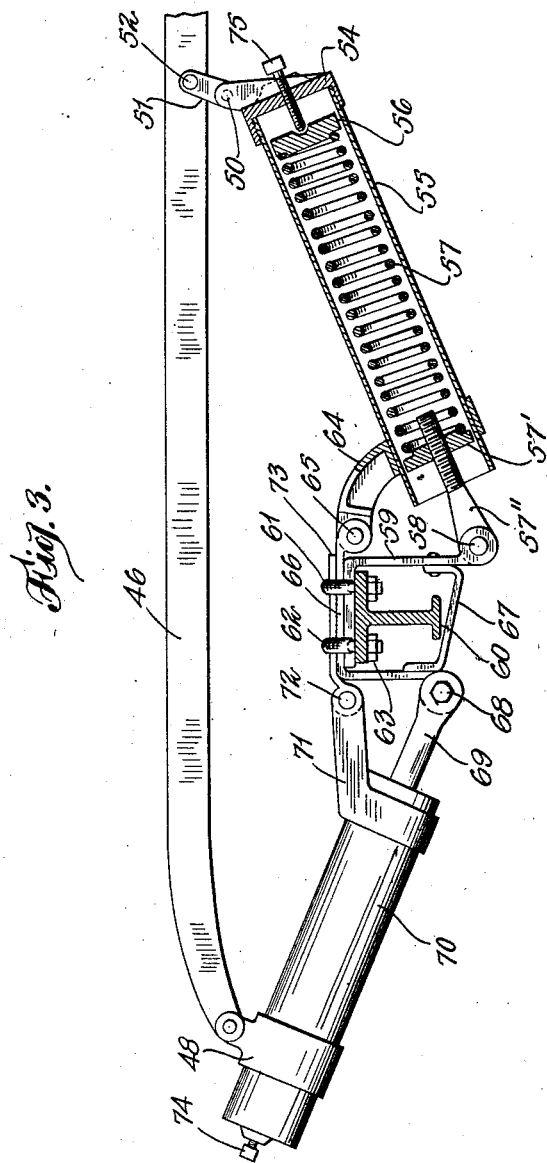

1,763,192

UNITED STATES PATENT OFFICE

SUMNER S. SHEARS, OF BROOKLYN, NEW YORK

VEHICLE SPRING

Application filed June 28, 1926. Serial No. 119,126.

This invention relates to improvements in vehicle springs, as they are for instance described in my co-pending applications, Serial No. 565,100, filed June 1, 1922, and Serial No. 601,823, filed November 18, 1922, and it is the principal object of the present invention to provide a vehicle spring arrangement adapted to carry the vehicle load indirectly by disseminating the shock longitudinally.

With this end in view, the invention consists principally in the provision of a flexible member which at one end is pivotally connected to the vehicle frame and at its other end yieldingly connected to the frame, while its midsection is connected to the axle.

Another object of the invention is the provision of a vehicle spring arrangement comprising tubular levers fulcrumed at the axle and pivotally connected to the frame at their power ends.

A further object of the invention is the provision of a vehicle spring arrangement comprising tubular levers in which pistons are arranged at the ends of the rods thereof, the other ends of which are connected to the axle, while coil springs are wound about the rods within said tubular levers.

A still further object of the invention is the provision of a vehicle spring arrangement in which means are provided allowing a double adjustment of the tension of the springs.

It is also one of the objects of the invention to provide a vehicle spring arrangement embodying bell-crank levers so apportioned as to provide a substantial leverage ratio, and pivotally fulcrumed at the axle, while the power ends of these levers are yieldingly attached to the vehicle frame.

These and other objects and advantages of my invention will become more fully known as the description thereof proceeds, and will then be specifically defined in the appended claims.

In the accompanying drawing, forming a material part of this disclosure:

Figure 1 is a side elevational view of a spring arrangement constructed according to the present invention, partly in section.

Figure 2 is a similar view of a modified form of spring arrangement.

Fig. 3 is a view similar to that of Fig. 2, with the leaf spring omitted.

As shown in Figure 1, the frame 10 of a vehicle body has pivotally connected thereto, as at 10', a flexible member 11 at one end thereof, while the opposite end of said flexible member is yieldingly connected to the frame by means of a plate 12 pivotally attached to the frame, as at 13, on the pivot point or pin 13 of plate 12 is also held the upper, ring-shaped end of an arm 14, the lower end of which carries a pin 15 adapted to travel in the opening of a closed loop 16 on plate 12.

To the pivot point 10' is also pivotally attached a bracket or band 17 adapted to surround the upper end of an inclined tubular lever 18, holding the same in position. In said lever a piston 19 at the end of a piston rod 20 is reciprocating. A spring 21 is wound about the rod 20 within the tubular lever and rests with one of its ends on suitable shoulders 22 of a collar 23, while its other end engages similar shoulders on a collar 24.

The end of rod 20 projects from the tubular lever and is screwed into a rocker-arm 25 fulcrumed, as at 26, to the lower end of an arm of a bracket 27 resting with its upper bar, connecting the two lateral bracket arms upon the vehicle axle 28, held thereon by means of bolts 29, provided with nuts 30 at their lower ends, while their upper, threaded ends 31 are held in the flexible member 11, and a block 32 is interposed between axle 28 and member 11.

To the other arm of bracket 27 is fulcrumed, as at 33, a rocker-arm 34 into which is threaded one end of a rod 35, the other end of which extends into the inclined tubular lever 36 in which a piston 37 is reciprocating, while a coil spring 38 is wound about the rod 35 and rests with its lower end on a shouldered collar 39, and with its upper end on a shoulder 40. The tension of springs 21 and 38 can be adjusted by means of adjusting screws 41 and 42 respectively entering the heads 43 and 44 of the tubular levers 18 and 36 respectively, while the lower end of plate 12 is formed into a band 45 surrounding the outer periphery of tubular lever 36. The tension of the springs can also be adjusted by the proper manipulation of the rods 20 and 35, and the collars 23 and 39 respectively.

A modified form of my device is illustrated in Figure 2 and as shown in said figure, the frame 46 of the vehicle has pivotally attached thereto, as at 47, a band or bracket 48, and one end of a flexible member 49, the opposite end of which is attached to the pivot point 50 of the arms of a bellcrank lever, having its opposite arm 51 pivotally secured, as at 52, to the frame 46, and the lever arm 53 of which carries a head 54 screwed onto the upper end of an inclined tubular lever 55 in which a piston 56 is movably arranged.

A spring 57 in said tubular lever engages with its upper end suitable shoulders formed on piston 56, while its lower end is seated on suitable shoulders of a collar 57'. A pin 57" has one end entering said tubular lever and threaded into collar 57', while its opposite end is fulcrumed, as at 58, to the lower end of a bracket arm 59 resting upon the vehicle axle 60 held thereon by bands 61, 62 bearing nuts 63 at their lower ends.

A rocker arm 64 formed into a holding band for the tubular lever 55 is pivoted, as at 65, to a bracket arm 66 having its lower end spaced from bracket arm 59 by means of a member 67, and pivotally secured to the lower end of arm 66, as at 68, is the end of a pin 69, similar to pin 57", extending into the second tubular inclined lever 70 which is held by the band-shaped end of an arm 71 pivoted, as at 72, to a bracket arm 73 resting on top of arm 66 and held to the same and the arm 59 and to the axle by the bands 61, 62.

Adjusting pins 74, 75 respectively enter the tubular lever heads into engagement with suitable recesses in the pistons for allowing an adjustment of the tension of the springs, so that also here a double adjustment of the tension of these springs is provided for, by pins 74, 75 or by means of pins 57" and 69.

The operation of my novel spring arrangement will be entirely clear from the above description without further explanation, and it is to be understood, that such changes may be made in the general arrangement and in the construction of the minor details here shown and described as an example, as come within the scope of the appended claims without departure from the spirit of the invention and the principles involved.

Having thus described my invention, what I claim as new and desire to secure by Letters Patent, is:

1. In combination with a vehicle frame and axle, a flexible member pivotally connected to the frame at one end, yieldingly connected to the frame at the other end and connected to the axle near its midsection; tubular levers fulcrumed at the axle and pivotally connected to the frame at their power ends, rods pivotally connected to a bracket on the axle, pistons fixed upon the ends of said rods and coil springs within the tubular levers in such manner as to be compressed by said pistons upon the downward movement of the power ends of said levers.

2. In combination with a vehicle frame and axle, a flexible member pivotally connected to the frame at one end yieldingly pivoted to the frame at the other end connected near its midsection to the axle; tubular levers fulcrumed at the axle and pivotally connected at the frame, rods pivotally connected to a bracket on the axle, pistons fixed upon the ends of said rods, coil springs within the tubular levers so applied as to carry the vehicular load and be compressed and expanded by the movements of the tubular levers and means for adjusting the tension of the coil springs.

3. In combination with a vehicle frame and axle, a flexible member supporting said axle in proper alignment and position with relation to said frame, tubular levers slantingly applied with their fulcrums pivotally connected at their axle ends and their power ends connected pivotally to said frame, pistons within the tubular levers, piston rods connected to said pistons and pivoted at the axle, below the fulcrums, coil springs within the tubular levers arranged to be compressed by the pistons upon the downward movement of the frame ends of the levers, means on the piston rods for adjusting the position of the piston and the tension of the coil springs and means at the frame ends of said tubular levers for adjusting the spring tension.

4. In combination with a vehicle frame and axle, a flexible member pivotally connected to said frame at one end and rigidly connected near its midsection to said axle, means on said frame to which the other end of said member is secured, elongated tubular housings connected pivotally at their outer ends to the frame, rocker arms on the inner ends of said tubular housings and pivoted at the axle, coil springs within the tubular housings, pistons within the housings and resting the coil springs, piston rods connecting the pistons at the axle, below the fulcrums, means on the piston rods for adjusting the tension of the coil springs and means at the frame ends of the housings for further adjusting said spring tension.

5. In combination with a vehicle frame and axle, a flexible member pivotally connected to the frame at one of its ends, its midsection being rigidly connected to said axle, a means on said frame to which the other end of said flexible member is secured, a bracket on said axle, tubular lever housings pivotally connected at their outer ends with said frame, rocker arms pivoted to the axle bracket and fixedly connected to the inner ends of the tubular levers, pistons within the tubular levers and pivotally connected to the axle bracket below the fulcrums by means of piston rods, means for adjusting the pistons and means for adjusting the tension of the coil springs.

6. In combination with a vehicle frame and axle, a flexible member pivotally connected to the frame at one end, yieldingly connected to the frame at its other end and fixedly connected near its midsection to the axle, a bracket on the axle, bellcrank levers fulcrumed to said bracket below the fulcrums, rods pivotally connected to said bracket, collars on the rods, threads on the rods for the adjustment of said collars, a collar at the frame ends of the levers, a piston at the other ends of the levers, coil springs between each collar and piston and means for adjusting the tension of the coil springs.

7. In combination with a vehicle frame and axle, a flexible member pivoted to the frame at one end, yieldingly connected to the frame at its other end, fixedly connected near its midsection to the axle, a bracket on the axle, tubular levers fulcrumed at the bracket by means of rocker arms, pistons connected pivotally to the bracket below the fulcrums by means of piston rods, spring seat collars on the rods, threads on the rods for adjusting the position of the pistons, spring seat collars in the frame ends of the tubular levers, springs between the collars, means for adjusting the tension of the springs from the outside of the tubular levers.

8. In combination with a vehicle frame and axle, a means for maintaining the axle in proper position with relation to the frame, a bracket on the axle, bellcrank tubular levers fulcrumed at the bracket, a collar at one end and a piston on the other end of said tubular levers, rods connected to one of these collars and pivotally connected to the axle bracket, coil springs between each other and piston and means for adjusting the position of the collars and tension of the springs.

Signed at New York in the county of New York and State of New York this sixth day of May A. D. 1926.

SUMNER S. SHEARS.